United States Patent
Honda

(10) Patent No.: US 11,178,058 B2
(45) Date of Patent: Nov. 16, 2021

(54) INFORMATION PROCESSING DEVICE, INFORMATION PROCESSING METHOD AND RECORDING MEDIUM

(71) Applicant: NEC CORPORATION, Tokyo (JP)

(72) Inventor: Atsushi Honda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/495,921

(22) PCT Filed: Mar. 16, 2018

(86) PCT No.: PCT/JP2018/010415
§ 371 (c)(1),
(2) Date: Sep. 20, 2019

(87) PCT Pub. No.: WO2018/180582
PCT Pub. Date: Oct. 4, 2018

(65) Prior Publication Data
US 2020/0136979 A1    Apr. 30, 2020

(30) Foreign Application Priority Data

Mar. 30, 2017  (JP) .............................. JP2017-067482

(51) Int. Cl.
*H04L 12/851* (2013.01)
*H04L 12/853* (2013.01)
(Continued)

(52) U.S. Cl.
CPC ........ *H04L 47/2408* (2013.01); *H04L 47/245* (2013.01); *H04L 47/2416* (2013.01);
(Continued)

(58) Field of Classification Search
None
See application file for complete search history.

(56) References Cited

U.S. PATENT DOCUMENTS

2003/0189943 A1* 10/2003 Gorti ..................... H04L 47/56
                                                    370/412
2007/0030834 A1*  2/2007 Rappaport ........ H04W 74/0833
                                                    370/338
(Continued)

FOREIGN PATENT DOCUMENTS

EP    2725436 A1 *  4/2014   ......... G05B 19/0423
EP    2725436 B1     4/2017
(Continued)

OTHER PUBLICATIONS

Communication dated Feb. 7, 2020, from the European Patent Office in European Application No. 18776101.0.
(Continued)

*Primary Examiner* — Lonnie V Sweet
(74) *Attorney, Agent, or Firm* — Sughrue Mion, PLLC

(57) ABSTRACT

Provided is a method for suppressing delay of data transmission due to DTN communication, in an information processing device that performs communications using a communication means which includes a DTN. An information processing device comprises a priority setting unit that sets a lower priority to the transmission of periodic data if, in the transmission or reception of the periodic data to and from another device, the timing of the periodic data transmission overlaps the transmission of high priority data. In addition, the priority setting unit sets the data transmission priority in accordance with: the difference between data stored in the other device and data stored in the own device; or data for which transmission to the other device has been completed, from among the data stored in the own device.

2 Claims, 9 Drawing Sheets

(51) Int. Cl.
*H04L 12/801* (2013.01)
*H04W 28/02* (2009.01)
*H04W 84/18* (2009.01)

(52) U.S. Cl.
CPC ........... *H04L 47/14* (2013.01); *H04W 28/021* (2013.01); *H04W 84/18* (2013.01)

(56) References Cited

U.S. PATENT DOCUMENTS

| | | | | |
|---|---|---|---|---|
| 2014/0036929 | A1* | 2/2014 | Lih | H04L 49/90 370/412 |
| 2014/0200684 | A1* | 7/2014 | Mizutani | G05B 19/4185 700/23 |
| 2015/0271231 | A1* | 9/2015 | Luby | H04L 47/26 709/231 |
| 2016/0006695 | A1* | 1/2016 | Prodoehl | H04L 43/08 726/12 |
| 2017/0093727 | A1* | 3/2017 | Chen | H04W 72/1263 |

FOREIGN PATENT DOCUMENTS

| | | |
|---|---|---|
| JP | 2014-17549 A | 1/2014 |
| JP | 2016-525246 A | 8/2016 |
| JP | 2017-41882 A | 2/2017 |
| WO | 2013/125104 A1 | 8/2013 |
| WO | 2016/132530 A1 | 8/2016 |

OTHER PUBLICATIONS

Ranju Pant et al., "DTN Overlay on OLSR Network", Proceedings of the Sixth Asian Internet Engineering Conference on, Aintec '10, Jan. 1, 2010,, pp. 56-63 (8 pages total).
International Search Report for PCT/JP2018/010415 dated Jun. 12, 2018 [PCT/ISA/210].
Written Opinion for PCT/JP2018/010415 dated Jun. 12, 2018 [PCT/ISA/237].

* cited by examiner

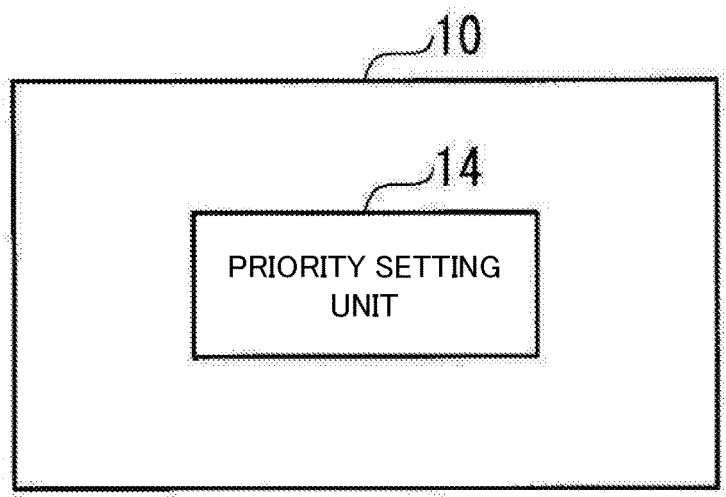
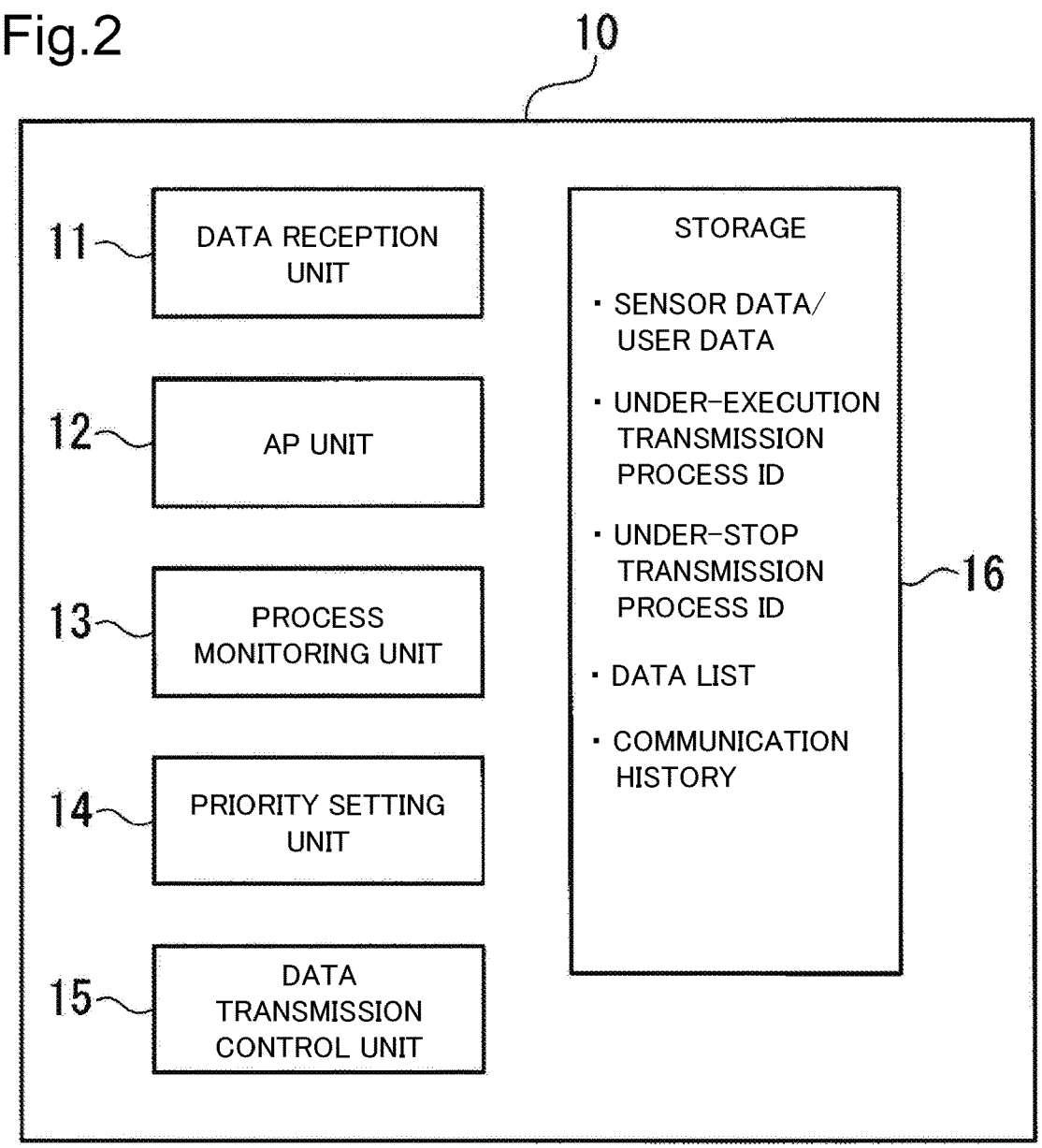

INFORMATION PROCESSING DEVICE, INFORMATION PROCESSING METHOD AND RECORDING MEDIUM

CROSS REFERENCE TO RELATED APPLICATIONS

This application is a National Stage of International Application No. PCT/JP2018/010415, filed on Mar. 16, 2018, which claims priority from Japanese Patent Application No. 2017-067482, filed on Mar. 30, 2017, the contents of all of which are incorporated herein by reference in their entirety.

TECHNICAL FIELD

The present invention relates to an information processing device, an information processing method, and a recording medium.

BACKGROUND ART

With spread of Internet of Things (IoT), a sensor and an information processing device (gateway device) which collects data detected by the sensor are sometimes provided. Information detected by the sensor includes, for example, urgent data and data of which ensured propagation is regarded more important than urgency. For transmission of the urgent data, for example, an ad hoc routing protocol such as an optimized link state routing protocol (OLSR) is used. The OLSR does not ensure data transfer, however, has a high capability of real-time concerning the data transfer. Meanwhile, for data required to be surely propagated, for example, delay/disruption tolerant network (DTN) is used. Even under an unreliable and inferior communication environment, where inter-node connectivity is unstable, an interruption or a disconnection occurs frequently, and a large transmission delay occurs in such as a wireless ad hoc network and a satellite link, the DTN achieves reliable data transfer which surely delivers data/contents between ends.

As a related art, for example, PTL 1 discloses a control method as follows. In the control method of PTL 1, when a first communication frame having a higher priority and a second communication frame having a lower priority are present and a transmission request for the first communication frame occurs during transmission of the second communication frame, it is determined whether the first communication frame can be delivered to a transmission destination within an allowed time. When it is determined that the first communication frame cannot be delivered within the allowed time, the transmission of the second communication frame is interrupted, and priority is given to transmission of the first communication frame having the higher priority. Moreover, PTL 2 discloses a control method capable of invalidating a remote communication such as an access to an IoT device via the Internet based on a predetermined determination criterion for an issue of reducing a risk on security in an IoT network.

CITATION LIST

Patent Literature

[PTL 1] International Publication No. WO 2016/132530
[PTL 2] Japanese Unexamined Patent Application Publication (Translation of PCT Application) No. 2016-525246

SUMMARY OF INVENTION

Technical Problem

Incidentally, when communication by the DTN is used in the IoT network, it is concerned that the DTN communication occupies a network resource for a long time and then a delay of communication having a higher priority occurs. Note that neither PTL 1 nor PTL 2 discloses a technology for solving this problem.

In view of the above, an object of the present invention is to provide an information processing device, an information processing method, and a recording medium which solve the above-mentioned problem.

Solution to Problem

An information processing device of the present invention, as an aspect, includes a priority setting unit that, in transmitting and receiving periodic data with another device, when timing of transmitting the periodic data and timing of transmitting data having a higher priority than the periodic data overlap each other, sets a lower priority for transmission of the periodic data than transmission of the data.

An information processing method of the present invention, as an aspect, includes, in transmitting and receiving periodic data with another device, when timing of transmitting the periodic data and timing of transmitting data having a higher priority than the periodic data overlap each other, setting a lower priority for transmission of the periodic data than transmission of the data.

A computer-readable recording medium of the present invention stores a program. The program, as an aspect, causes a computer to execute processing of, in transmitting and receiving periodic data with another device, when timing of transmitting the periodic data and timing of transmitting data having a higher priority than the periodic data overlap each other, setting a lower priority for transmission of the periodic data than transmission of the data.

Advantageous Effects of Invention

According to the present invention, timing of transmitting data is changed depending on a priority relationship with transmission processing of the other data under execution, thereby data required to be rapidly propagated can be transmitted preferentially.

BRIEF DESCRIPTION OF DRAWINGS

FIG. 1 is a block diagram illustrating a minimum configuration of a gateway device according to a first example embodiment of the present invention.

FIG. 2 is a functional block diagram illustrating an example of the gateway device according to the first example embodiment of the present invention.

EXAMPLE EMBODIMENT

First Example Embodiment

Figure 3:
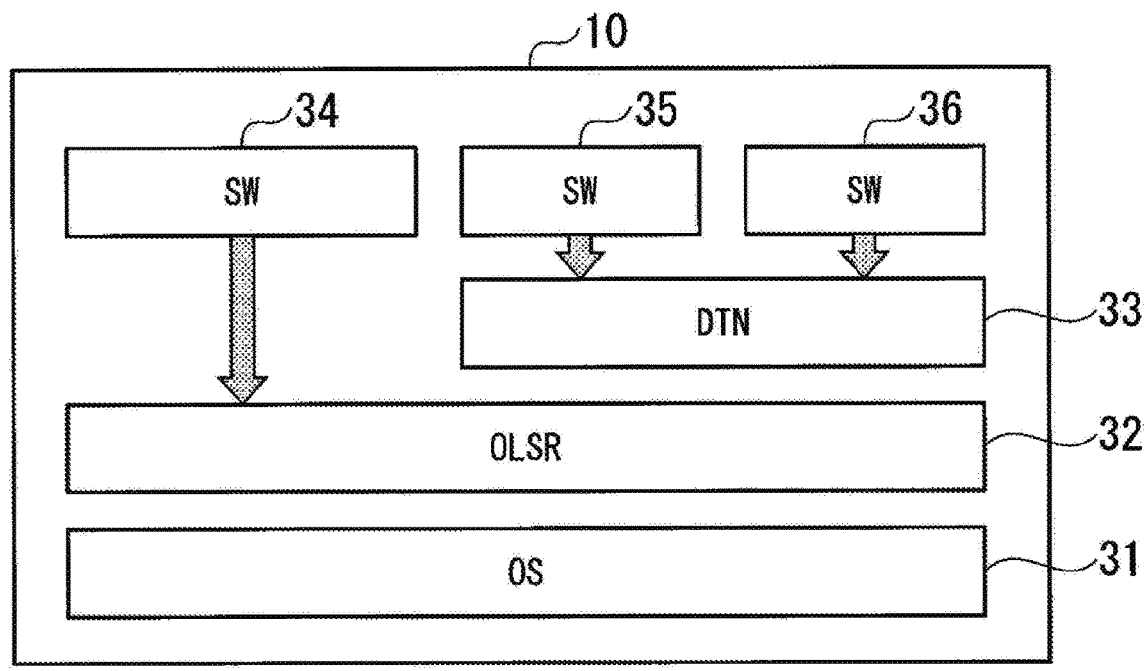
FIG. 3 is a diagram illustrating a configuration example of a transmission function of the gateway device according to the first example embodiment of the present invention.

A description will be given below on a gateway device (information processing device) according to an example embodiment of the present invention with reference to FIGS. 1 to 7.

Note that a unidirectional arrow in the drawings directly illustrate a direction of a data flow, and do not exclude bidirectionality thereof.

FIG. 1 is a diagram illustrating a minimum configuration of a gateway device according to a first example embodiment.

A gateway device 10 is connected to one or a plurality of sensors, a variety of terminal devices such as smartphones, tablet terminals and personal computers (PCs) and other gateway devices 10. The gateway device 10 acquires, from the sensor, data (sensor data) detected by the sensor, and acquires, from a portable terminal device, data (user data) input by a user to the portable terminal. Then, the gateway device 10 transmits the acquired sensor data and user data to another gateway device 10, and shares, among a plurality of the gateway devices 10, the sensor data and the user data which are acquired by each of the gateway devices 10. The sensor data and the like have difference of property. For example, the sensor data and the like include highly urgent real-time data required to be rapidly propagated and less urgent data required to be surely propagated. The gateway device 10 changes a priority of transmission timing of a piece of the sensor data and the like based on the differences of property among each piece of the data. For example, when transmission processing of less urgent data is activated while urgent data are transmitted (or within a predetermined time after the urgent data are transmitted), the gateway device 10 suspends the transmission processing of the less urgent data, and preferentially transmits the urgent data. In order to perform such a control, the gateway device 10 includes a function (a priority setting unit 14) of setting a priority of data transmission processing. As illustrated in FIG. 1, the gateway device 10 includes at least the priority setting unit 14. In transmitting and receiving periodic data with another device, the priority setting unit 14 sets a lower priority for transmitting the periodic data when timing of transmission of the periodic data and timing of transmission of data having a higher priority overlap each other. Moreover, the priority setting unit 14 sets the priority of transmission of the data further depending on a difference between data stored by the another device and data stored by the information processing device and a difference between the data stored by the information processing device and data of which transmission to the another device is completed among the data stored by the information processing device.

FIG. 2 is a functional block diagram illustrating one example of the gateway device according to the first example embodiment of the present invention.

As illustrated, the gateway device 10 includes a data reception unit 11, an AP unit 12, a process monitoring unit 13, the priority setting unit 14, a data transmission control unit 15, and a storage 16.

The data reception unit 11 receives the sensor data from the sensor. Moreover, the data reception unit 11 receives the user data input to the terminal device by the user.

The application (AP) unit 12 acquires the sensor data and the like received by the data reception unit 11, and outputs the sensor data and the like to an appropriate communication means. Note that sensor data to be transmitted by the DTN and sensor data to be transmitted by the OLSR are predetermined, and based on such the information, the AP unit 12 assigns the sensor data and the like received by the data reception unit 11 to the appropriate communication means. The AP unit 12 is configured by a plurality of pieces of software prepared for each piece of the sensor data. For example, the AP unit 12 may include software for acquiring data measured by a temperature sensor via the data reception unit 11, outputting the acquired data to the data transmission control unit 15 to be described later, and transmitting the output data by the appropriate connection means. The AP unit 12 may include software for acquiring the data input by the user to the terminal device via the data reception unit 11, outputting the acquired data to the data transmission control unit 15 to be described later, and transmitting the data by the appropriate communication means.

The process monitoring unit 13 monitors an operation state of software for data transmission, such as a process and a task of data transmission in the gateway device 10. For example, when transmitting data A, the process monitoring unit 13 monitors a process of transmission processing α for transmitting the data A, and detects activation of the transmission processing α.

The priority setting unit 14 is as described in FIG. 1.

The data transmission control unit 15 controls data transmission processing in accordance with the priority set by the priority setting unit 14. More specifically, the gateway device 10 according to the present example embodiment periodically (cyclically) transmits and receives a data list with another gateway device 10. The data list is a list that data stored by the information processing device are listed. When transmitting data having a higher priority while transmitting the data list, the data transmission control unit 15 stops (suspends or discontinues) the transmission processing of the data list. Moreover, in the present example embodiment, the data transmission control unit 15 has a function of transmitting data by the DTN and the OLSR.

The storage 16 stores the sensor data and the user data. Moreover, the storage 16 stores a process ID of transmission processing under execution and a process ID of transmission processing under suspension. Moreover, the storage 16 stores a data list in which the sensor data and the like held by the information processing device are listed, and a history of communication with the another gateway device 10. Moreover, the storage 16 may store data priority setting information (which piece of sensor data to be transmitted preferentially).

FIG. 3 is a diagram illustrating a configuration example regarding a transmission function of the gateway device according to the first example embodiment of the present invention.

FIG. 3 illustrates that, on an operating system (OS) 31 included in the gateway device 10 (hereinafter, written as a "GW device 10"), a software 32 (hereinafter, written as "OLSR 32") and a software 33 (hereinafter, written as "DTN 33") are operated. The OLSR 32 is a software to transmit data based on OLSR protocol. The DTN 33 is a software for transmitting data using the DTN system and is higher order than the OLSR 32. The DTN 33 uses the OLSR 32 for routing processing, and accordingly, is illustrated on the higher order than the OLSR 32. In the GW device 10, the OLSR 32 is used for transmission of data required to be propagated in real time, and the DTN 33 is used for transmission of data required to be made sure to arrive.

For example, the software 34 (hereinafter, written as "SW 34") is software for transmitting and receiving the data required to be propagated in real time and the urgent data. The SW 34 acquires the data required to be propagated in real time, and transmits the data by the OLSR 32. Meanwhile, SW 35 and SW 36 are software for transmitting the data required to be made sure to arrive. SW 35 and SW 36 acquire the data required to be made sure to arrive, and transmit the data by the DTN 33. These pieces of SW 34 to SW 36 are an example of the AP unit 12.

Herein, an application example of the GW device 10 is described. The GW device 10 of the present example embodiment is used, for example, for information propagation and information sharing at a place such as a factory and a public facility, where a wide area network cannot be used sufficiently. The GW device 10 can be used, for example, for work management for workers in a factory, monitoring of an environment in the factory, and the like. For example, in the factory, a plurality of the GW devices 10 are installed at a predetermined interval, and further, a plurality of sensors are installed at a predetermined interval. The sensors to be installed are, for example, thermometers, noise meters, fire detectors, and the like. The sensors sense and measure temperature, noise, smoke, and the like in environments around the sensors at a predetermined time interval, and transmit the measured sensor data to a predetermined GW device 10 installed nearby. The sensor data are used for confirming that there is no abnormality or danger in the factory and for quality management of products manufactured in the factory, and are required to be propagated in real time. Upon acquiring the sensor data, the SW 34 transmits the sensor data to the another GW device 10 by using the OLSR 32. The sensor data includes identification information of the sensor and a measurement time of the sensor data. Processing in which the another GW device 10 that has acquired the sensor data transfers the acquired sensor data to still the another GW device 10 is repeated. Finally, the sensor data are transmitted, for example, to a monitoring terminal device that monitors the inside of the factory. An administrator of the factory refers to the sensor data transmitted to the monitoring terminal device, and monitors whether an abnormality occurs in the factory, and the like.

Moreover, in the factory, each of the workers performs work of which the worker is in charge at predetermined work positions. For example, the worker is supplied with a portable terminal device such as smartphone and tablet terminal. And the worker inputs actual result information (user data) on the work performed by the worker to the portable terminal device. The portable terminal device stores position information of the information processing device which is acquired by GPS positioning for example. The portable terminal device transmits information such as identification information of the worker, an actual working result of the worker, and the position information (work place of the worker) of the information processing device to a GW device 10 installed nearby. The user data and the like are used for a progress management for the work of the worker, an attendance management for the worker, and the like. For example, the user data and the like are required to be surely transmitted to (to be made sure to arrive at) a server device for the attendance management before aggregation processing for the actual working results of all the workers which is performed in the following morning. However, the user data and the like are not required to be propagated in real time. Upon acquiring the user data and the sensor data (position information), the SW 35 transmits the acquired user data and sensor data to the another GW device 10 by using the DTN 33. As in the case of the sensor data required to be propagated in real time, processing in which the another GW device 10 that has acquired the user data and the like further transfers the acquired user data and the like to still the another GW device 10 is repeated, and finally, the user data and the like are transmitted to the server device for the attendance management. Moreover, when some abnormality occurs during work, the worker inputs urgent user data to the portable terminal device. In this case, the SW 35 can transmit, based on a matter that the data input by the worker has high urgency, the data to the another GW device 10 by the OLSR 32.

As described above, in the present example embodiment, the data required to be propagated in real time and the data required to be made sure to arrive are transmitted by using different communication means. In this case, for example, when the transmission timing of the data required to be propagated in real time and the transmission timing of the data required to be made sure to arrive overlap each other, it is concerned that the transmission of the data required to be propagated in real time may be delayed since the transmission processing of the data required to be propagated in real time is kept waiting or network congestion is caused by the data required to be made sure to arrive. Hereinafter, a more detailed description will be given on the communication processing of the present example embodiment.

Figure 11:
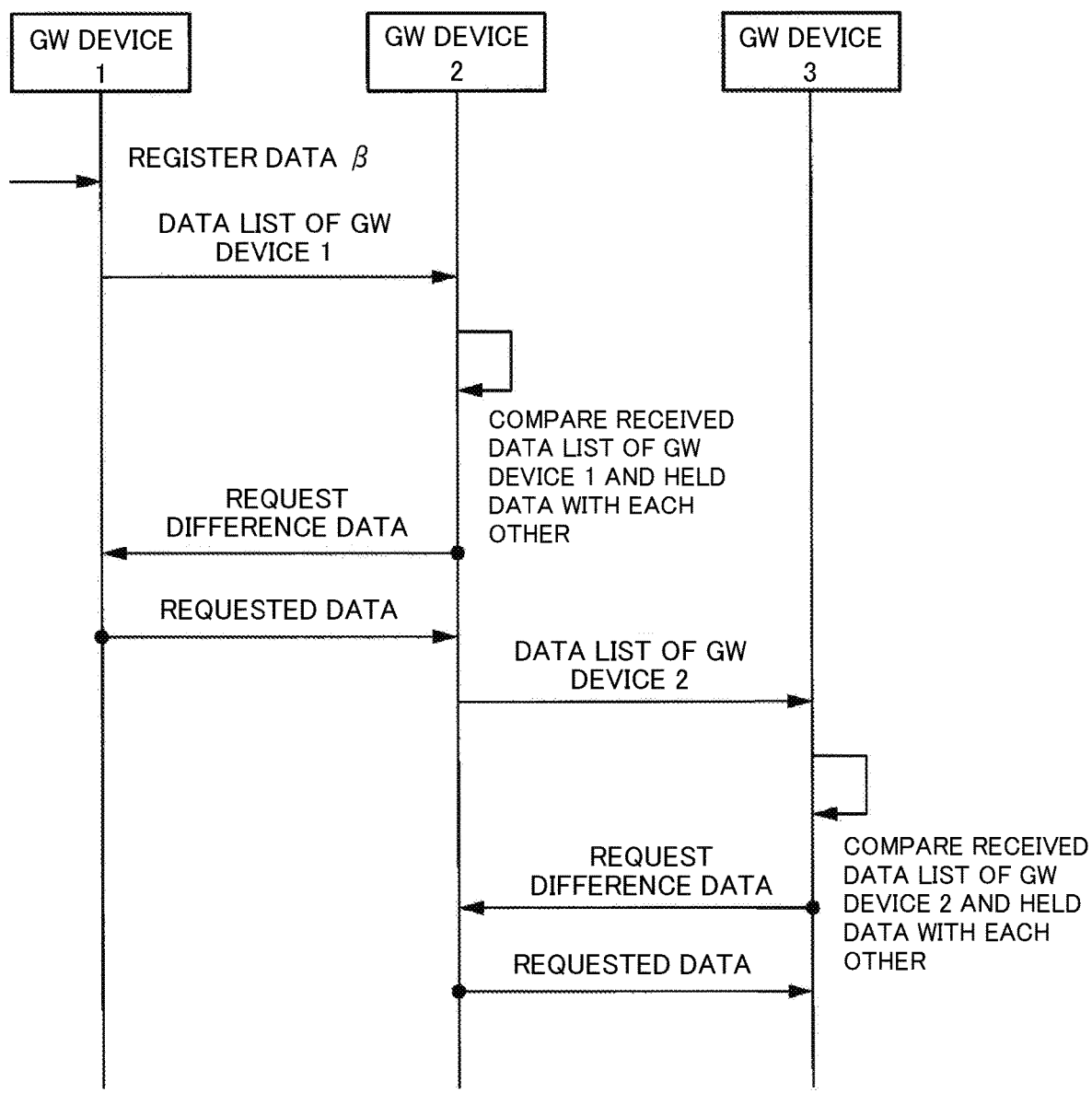
FIG. 11 is a diagram explaining processing by a DTN in the present invention.

First, referring to FIG. 11, transmission processing of data by the DTN is described. FIG. 11 is a diagram illustrating the transmission processing by the DTN in the present invention.

FIG. 11 illustrates a flow of processing in which data is transmitted and shared among a GW device 1, a GW device 2, and a GW device 3. In the DTN, list information (data list) of data registered in the information processing device is generated, and the data list is periodically transmitted to another GW device. The GW device that has received the data list compares the data listed in the received data list and data held by the information processing device with each other, and when data which are not present in the information processing device are listed in the data list, makes a request for the data to a transmission source of the data list, and acquires the lacking data. As described above, each of the GW devices is configured in such a way as to share data with one another. For example, as illustrated in FIG. 11, the GW device 1 registers new data β. Then, the GW device 1 add the data β to the data list. Then, when a predetermined data list transmission time is reached, the GW device 1 transmits the data list to which information on the data β is added, to the GW device 2. The GW device 2 receives the data list. The GW device 2 compares the received data list of the GW device 1 and data held by the GW device 2 with each other, and makes a request for difference data (data which are not held by the GW device 2) to the GW device 1. The GW device 1 transmits the requested difference data to the GW device 2. The GW device 2 receives the difference data from a GW1 terminal. The GW device 2 adds information on the data received from the GW1 terminal, to a data list of the GW device 2. Then, when a predetermined data list transmission time is reached, the GW device 2 transmits the data list to the GW device 3. Likewise, the GW device 3 makes a request for difference data in relation to the GW device 2, to the GW device 2, and the GW device 3 receives the difference data from a GW2 terminal.

As described above, in the DTN communication system, the data list is periodically transmitted and received. Then, based on the transmitted and received data list, communication for the request for the difference data, the data transmission in response to the request, and the like is performed. In the configuration illustrated in FIG. 3, the sensor data transmitted by the OLSR 32 must be preferentially transmitted to a transmission destination; however, it is concerned that the periodic transmission and reception of the data list on the DTN 33 and data communication originated therefrom may occupy a network band and may delay the transmission by the OLSR 32. In the present example embodiment, the priority setting unit 14 sets a priority for the data transmission processing, and controls the timing of the data transmission according to the priority, and thereby prevents urgent data transmission (data transmission by the OLSR) from being disturbed. Next, referring to FIGS. 4 to 6, a setting method of the priority according to the present example embodiment will be described.

Figure 4:
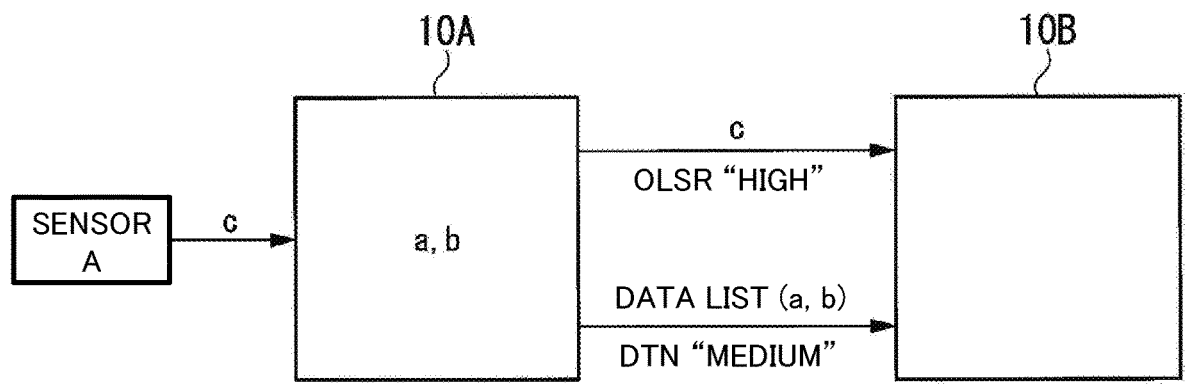
FIG. 4 is a first diagram explaining a setting method of a priority of transmission processing according to the first example embodiment of the present invention.

FIG. 4 is a first diagram explaining the setting method of the priority of the transmission processing according to the first example embodiment of the present invention.

FIG. 4 illustrates a GW device 10A and a GW device 10B. A sensor A measures sensor data c required to be propagated in real time, and transmits the sensor data c to the GW device 10A. In the GW device 10A, the data reception unit 11 receives the sensor data c. Next, the AP unit 12 outputs the sensor data c to the data transmission control unit 15, and instructs data transmission by the communication means associated with the data required to be propagated in real time. The data transmission control unit 15 transmits the sensor data c to the GW device 10B by the OLSR 32. The process monitoring unit 13 records, in the storage 16, a process ID of transmission processing of the sensor data c as a transmission processing process under execution. Moreover, it is assumed that timing of transmitting periodically a data list is reached by the GW device 10A during the transmission processing of the sensor data c. In the storage 16, data a and data b to be transmitted by the DTN and a data list in which the data a and b are listed are recorded. A DTN communication function (DTN 33) included in the data transmission control unit 15 activates a process of transmission processing of transmitting the data list. Then, the process monitoring unit 13 detects the process of the data list transmission processing, and the priority setting unit 14 sets a priority for the process of the data list transmission processing. In this case, since the transmission processing process (priority: "high") of the sensor data c required to be propagated in real time is under execution, and accordingly, the priority setting unit 14 sets a priority "medium" for the process of the data list transmission processing.

Note that the priority "high" of the sensor data c is based on a matter that the process ID of the transmission processing under execution, which is recorded in the storage 16, indicates transmission by the OLSR. Then, the data transmission control unit 15 suspends the transmission processing of the data list, and records, in the storage 16, a process ID of the transmission processing of the data list as a transmission processing process under suspension. The process monitoring unit 13 continues to monitor the transmission processing process of the sensor data c, and when the transmission of the sensor data c is completed, deletes the record of the under-execution transmission process ID recorded in the storage 16. Then, the data transmission control unit 15 resumes the transmission processing of the data list on the basis of the record of an under-stop transmission process ID recorded in the storage 16. The data transmission control unit 15 transmits the data list to the GW device 10B by the DTN. Note that the data transmission control unit 15 may control the processing of transmitting data in such a way as to discontinue the transmission at current timing instead of suspending the transmission processing of the data list, and to transmit the data list when the next data list transmission timing comes.

When transmitting general data, the transmission processing by the OLSR may be delayed by continuing both of the transmission processing by the OLSR and the transmission processing of the data list despite overlap between the timing of the transmission by the OLSR and the transmission timing of the data list. According to the present example embodiment, after the transmission processing by the OLSR having a higher priority is performed, the transmission processing of the data list is performed, and accordingly, the transmission of the data highly required to be propagated in real time can be performed without delay. Moreover, when the transmission of the data list is discontinued, occurrence of network congestion due to the transmission of the data list, the request for the unheld data by the terminal that has received the data list, and network congestion due to transfer of the data can be reduced.

Next, a description will be given on a case of performing the DTN transmission without lowering the priority of the DTN transmission even when the timing of the transmission by OLSR and the timing of the transmission by DTN overlap each other.

Figure 5:
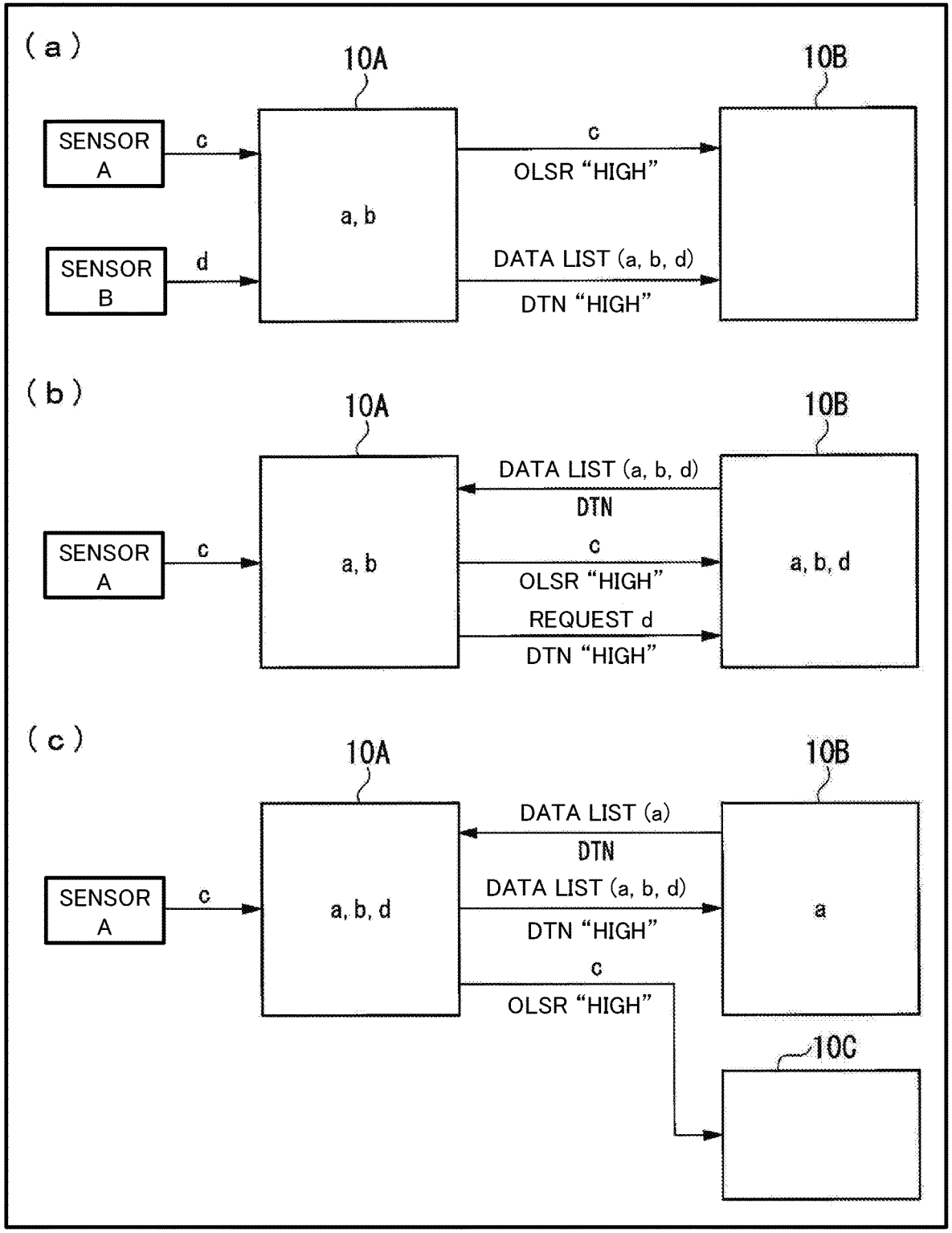
FIG. 5 is second diagram explaining the setting method of the priority of the transmission processing according to the first example embodiment of the present invention.

FIG. 5 is a second diagram explaining the setting method of the priority of the transmission processing according to the first example embodiment of the present invention.

In FIG. 5, a part (a) illustrates one example of transmission processing of a data list when new data is registered in the information processing device (GW device 10A). As in the case of FIG. 4, the sensor A measures the sensor data c required to be propagated in real time. In contrast, the sensor B measures sensor data d which are not required to be propagated in real time. In other words, the sensor data d measured by the sensor B are transmitted to the GW device 10B by the DTN. In FIG. 5, the part (a) illustrates that, after the GW device 10A receives the sensor data d measured by the sensor B, timing of transmitting a data list in which information on the sensor data d is listed is reached for the first time. Moreover, it is assumed that, at the timing, the GW device 10 A is already transmitting the sensor data c received a little while before. In the storage 16, an OLSR transmission processing process ID regarding the sensor data c is recorded.

In the storage 16, data a, b, and d to be transmitted by the DTN and a data list in which the data a, b, and d are listed are recorded. The data transmission control unit 15 (DTN 33) activates a process of transmission processing of transmitting the data list. Then, the process monitoring unit 13 detects the process of the data list transmission processing, and the priority setting unit 14 sets a priority for the process of the data list transmission processing. In this case, the transmission processing process (priority: "high") of the sensor data c required to be propagated in real time is under execution; however, the priority setting unit 14 sets a priority "high" for the process of the data list transmission processing based on a matter that the data list in which the sensor data d registered in the information processing device are listed is untransmitted. Note that the matter that the data list in which the sensor data d are listed is untransmitted can be determined by comparing a measurement time included in the sensor data d and a time when the data list was transmitted last time with each other. The data transmission control unit 15 continues the transmission processing of the data list, and records, in the storage 16, the process ID of the transmission processing of the data list as a transmission processing process under execution. Note that, when the transmission processing of the data list is completed, the data transmission control unit 15 deletes the process ID of the data list transmission processing under execution recorded in the storage 16. The same applies to the process ID of the transmission processing of the sensor data c.

In FIG. 4, the description has been given on the control that, when the timing of transmission by the OLSR and the transmission timing of the data list overlap each other, delays the transmission timing of the data list (or discontinues the transmission thereof), thus making it possible to execute the transmission processing by the OLSR without delay. Moreover, the exceptional control illustrated in the part (a) of FIG. 5 is added, whereby propagation of new data registered by the information processing device can be performed preferentially.

Note that, in the part (a) of FIG. 5, transmission destinations of the sensor data c and the data list are both the GW device 10B, however, the transmission destinations of the sensor data c and the data list may be different GW devices 10.

In FIG. 5, a part (b) illustrates one example of transmission processing of the data list when a request for the data transmission is issued from the information processing device (GW device 10A) to the other GW device 10B. As in the case of the part (a) of FIG. 5, it is assumed that, in the GW device 10A, the transmission processing of the sensor data c by the OLSR is under execution. In the storage 16, the process ID of the transmission processing by the OLSR regarding the sensor data c is recorded.

The data reception unit 11 is already received the data list from the GW device 10B. In the data list received from the GW device 10B, the data a, b, and d held by the GW device 10B are listed. In contrast, the GW device 10A holds only the data a and the data b. Then, the data transmission control unit 15 attempts to transmit, to the GW device 10B, a telegraphic message for requesting the data d which the GW device 10A does not hold. In FIG. 5, the part of (b) illustrates that timing of transmitting, to the GW device 10B, the telegraphic message for requesting the data d is reached. The data transmission control unit 15 activates a process of transmission processing of the telegraphic message for requesting the data d. Then, the process monitoring unit 13 detects the process of the transmission processing of the requesting telegraphic message, and the priority setting unit 14 sets a priority for the process of the transmission processing. In this case, the transmission processing process (priority: "high") of the sensor data c required to be propagated in real time is under execution; however, the priority setting unit 14 sets a priority "high" for the process of the transmission processing of the telegraphic message for requesting the data d based on a matter that the sensor data d which are not held by the information processing device are present. The data transmission control unit 15 continues the transmission processing of the telegraphic message for requesting the data d, and records, in the storage 16, the process ID of the transmission processing of the telegraphic message for requesting the data d as a transmission processing process under execution.

By this control, even when the timing of the transmission by the OLSR and the transmission timing of the telegraphic message for requesting unreceived data overlap each other, the unreceived data can be received preferentially by adding the control described with reference to the part (b) of FIG. 5. Note that the transmission destinations of the sensor data c and the data list may be different GW devices 10.

In FIG. 5, a part of (c) illustrates one example of transmission processing of a data list in a case of receiving the data list from a new GW device 10B or another GW device 10B with which no communication is made for a fixed period or more.

As in the case of parts (a) and (b) of FIG. 5, it is assumed that, in the GW device 10A, the transmission processing of the sensor data c by the OLSR is under execution.

The data reception unit 11 is already received the data list from the GW device 10B. As described above, in the storage 16, a history of communication with the another GW device 10 is recorded. The communication history includes identification information of the GW device 10 being a communication partner and a communication time. The DTN function included in the data transmission control unit 15 has a function of transmitting the data list of the data which are held by the information processing device, to the another GW device 10 which is not recorded in the communication history, or the GW device 10 with which communication is not made for a fixed period or more, upon receiving a data list from the above-described GW device 10. The GW device 10B in the part (c) of FIG. 5 is a terminal with which no communication was made in the past, and the part (c) of FIG. 5 represents that timing of transmitting the data list of the GW device 10A to the GW device 10B is reached. At this time, the data transmission control unit 15 activates a transmission processing process of the data list. Then, the process monitoring unit 13 detects the transmission processing process of the data list, and the priority setting unit 14 sets a priority for the transmission processing process. In this case, the transmission processing process (priority: "high") of the sensor data c required to be propagated in real time is under execution; however, based on a matter that the data list is received from the GW device 10B that is new or with which no communication is made for the fixed period, the priority setting unit 14 sets a priority "high" for the transmission processing process of the data list of the GW device 10A. The data transmission control unit 15 continues the transmission processing of the data list, and records, in the storage 16, a process ID of the transmission processing as the transmission processing process under execution.

When the data list is transmitted from the GW device 10B that is new or with which no communication is made for a long time, such a GW device 10B may not have any data. Accordingly, the data list is transmitted to the GW device 10B, and the GW device 10B is made capable of holding data equivalent to those of the another GW device 10. In this way, DTN communication with the GW device 10B is performed, however, communication traffic with the another GW device 10 is not increased, and moreover, after the GW device 10B holds a fair amount of data, traffic thereof is not increased. According to the control in the part (c) of FIG. 5, even when the timing of the transmission by the OLSR and the timing of transmitting the data list to the new GW device 10B overlap each other, the data list can be transmitted to the new GW device 10B, and accordingly, it becomes possible to rapidly propagate data also to the new GW device 10B.

In FIG. 5, the description has been given on the case of performing the DTN transmission without lowering the priority of the DTN transmission even when the timing of the OLSR transmission required to be made in real time and the timing of the DTN transmission overlap each other. Next, referring to FIG. 6, a description will be given on a case of further lowering the priority of the DTN transmission and discontinuing all the DTN communication including the transmission of the data list.

Figure 6:
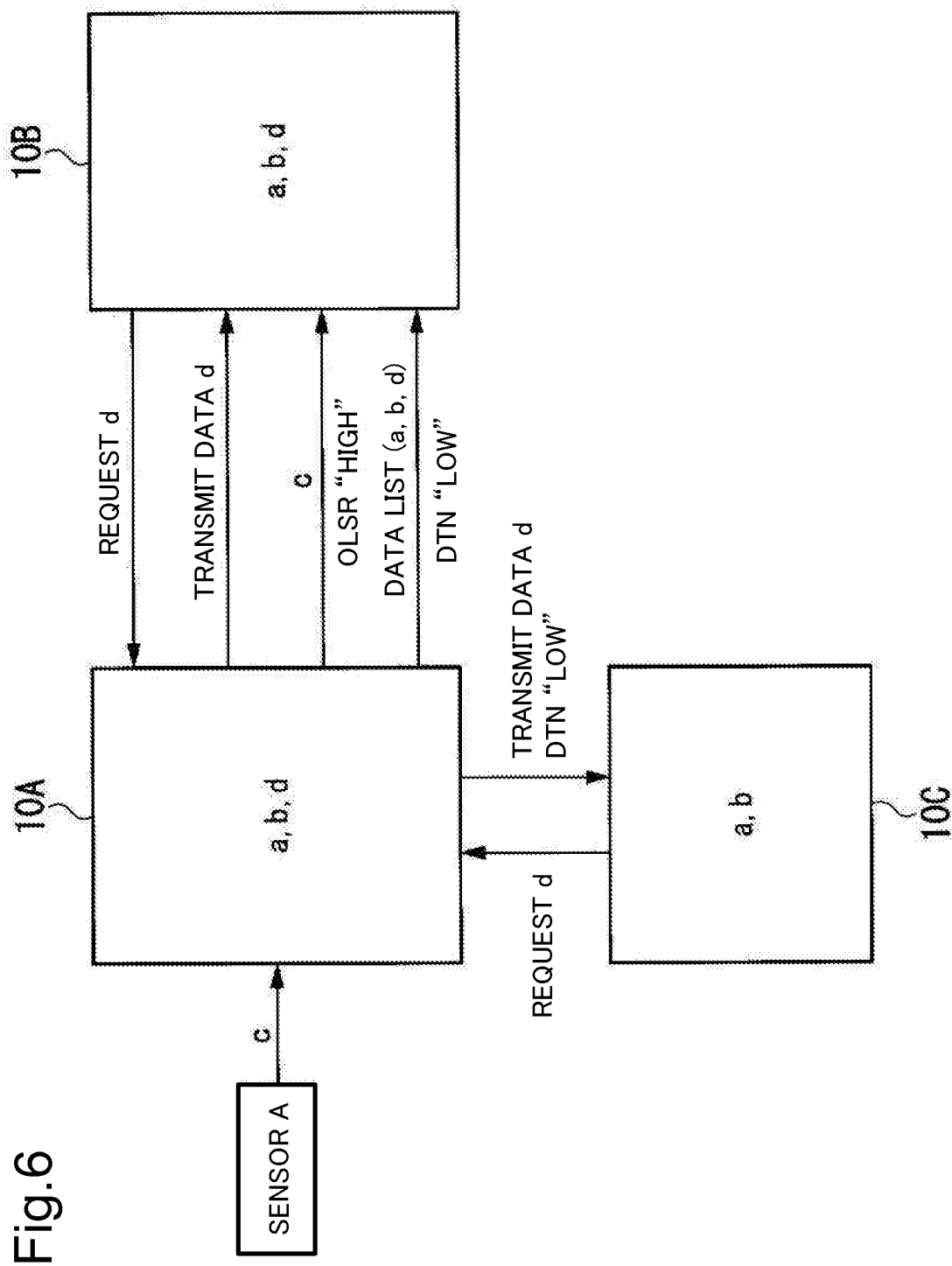
FIG. 6 is a third diagram explaining the setting method of the priority of the transmission processing according to the first example embodiment of the present invention.

FIG. 6 is a third diagram explaining the setting method of the priority of the transmission processing according to the first example embodiment of the present invention.

In FIG. 6, it is assumed that, in the GW device 10A, untransmitted data are not present with respect to new data registered by the information processing device. The matter that the untransmitted data are not present indicates a state where the new data are received by any one of the plurality of GW devices 10. For example, when the data d are registered in the GW device 10A, the GW device 10A transmits the data list in which the data d are listed. The GW device 10B receives the data list, and makes a request for the new data d to the GW device 10A. In response to the request, the GW device 10A transmits the data d to the GW device 10B, the GW device 10B receives the data d, and then the state where the untransmitted data are not present is established. The priority setting unit 14 refers to the communication history in the storage 16, and determines whether the untransmitted data are present.

In such a state, it is assumed that, in the GW device 10A, the transmission processing of the sensor data c by the OLSR is under execution. Moreover, it is assumed that, the GW device 10A is reached the timing of transmission of the data list to the GW device 10B. Moreover, it is assumed that the GW device 10A has received a request for the data d from a GW device 10C, and that the DTN function included in the data transmission control unit 15 activates a process of transmission processing of the data d in response to the request.

Then, the process monitoring unit 13 detects a transmission processing process of the data list to the GW device 10B and the transmission processing process of the data d to the GW device 10C, and the priority setting unit 14 sets the priority for the transmission processing processes. In this case, based on a matter that the transmission processing process (priority: "high") of the sensor data c required to be propagated in real time is under execution, and that the new data d held by the GW device 10A are already transmitted (to the GW device 10B) and no untransmitted data are present, the priority setting unit 14 sets a priority "low" for all the data transmission processing processes with respect to the DTN communication. In other words, "low" is set for both of the transmission processing process of the data list to the GW device 10B and the transmission processing process of the data d to the GW device 10C. In the control described with reference to FIG. 4, the priority "medium" is set for the data transmission processing process with respect to the DTN communication, and in that case, only the transmission processing of the data list is set to be discontinued. Meanwhile, in the present control of setting the priority "low" based on the matter that the untransmitted data are not present, all pieces of the transmission processing with respect to the DTN are to be discontinued.

In the example in FIG. 6, the data transmission control unit 15 suspends the data list transmission processing process to the GW device 10B and the data d transmission processing process to the GW device 10C, and records, in the storage 16, two process IDs of these processes as under-stop transmission processes. Then, upon completion of the transmission processing process of the data c, the data transmission control unit 15 resumes the data list transmission processing process to the GW device 10B and the data d transmission processing process to the GW device 10C. Note that the data list transmission processing process to the GW device 10B and the data d transmission processing process to the GW device 10C may be discontinued instead of being suspended.

When the data registered by the information processing device are transmitted at least once to the another GW device 10 (for example, the GW device 10B), then the data can be expected to be propagated to still the another GW device 10 from the GW device 10B as a transmission destination. Hence, when the untransmitted data become unpresent in the data registered by the information processing device, and another transmission processing process to be given priority is under execution, then all the DTN communications are discontinued, and the transmission processing to be given priority is advanced. As described above, the propagation of the data from the information processing device is suppressed, whereby the communication traffic is reduced, and the data required to be propagated in real time can be rapidly transmitted.

Next, a flow of the data transmission processing of the present example embodiment will be described with reference to FIG. 7.

Figure 7:
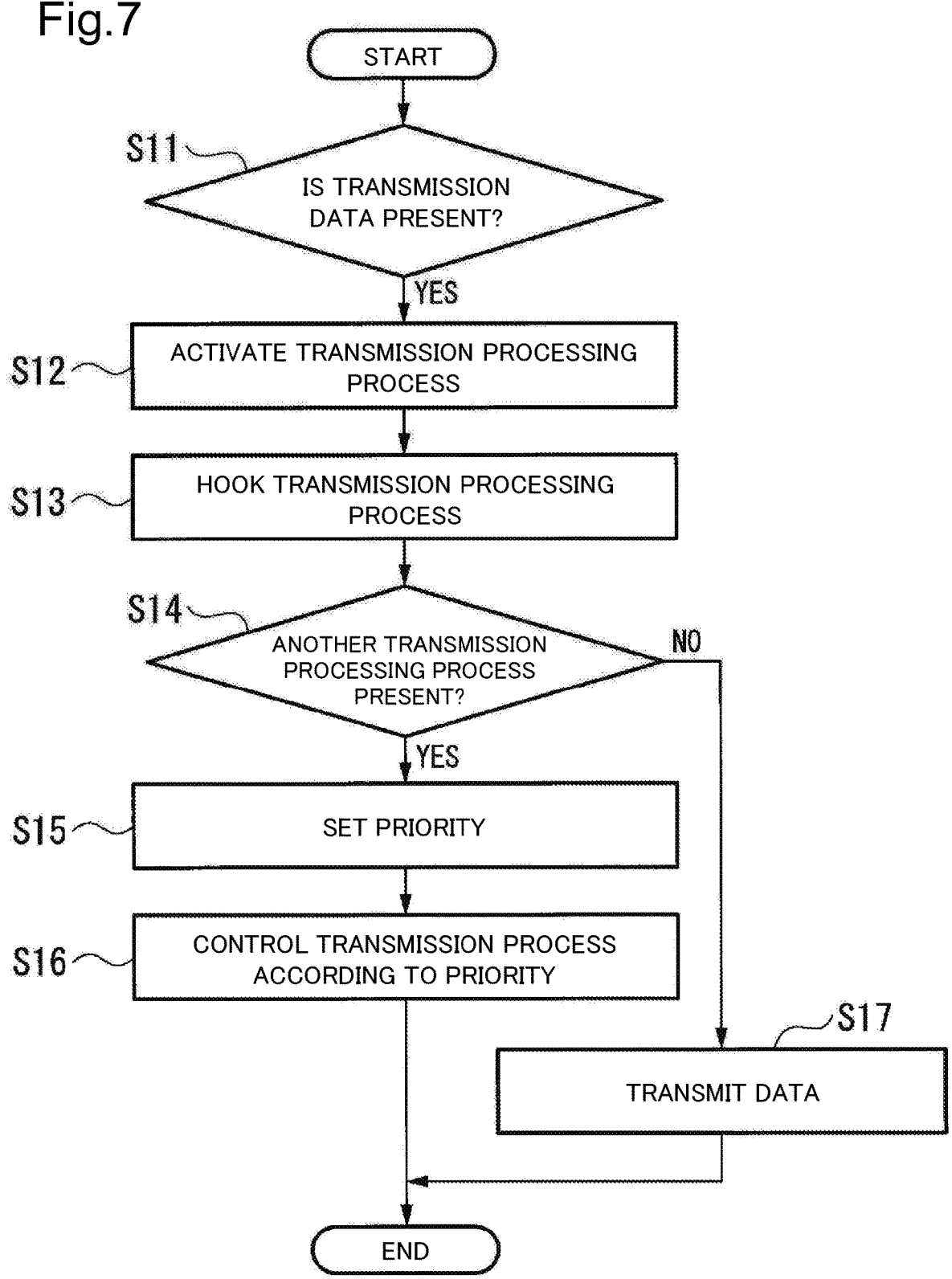
FIG. 7 is a flowchart illustrating an example of the transmission processing of the gateway device according to the first example embodiment of the present invention.

FIG. 7 is a flowchart illustrating an example of the transmission processing by the gateway device according to the first example embodiment of the present invention.

First, the data transmission control unit 15 determines whether data to be transmitted are present (Step S11). When such transmission data are not present, the data transmission control unit 15 is on standby. When the transmission data are present, the data transmission control unit 15 activates the transmission processing process of the transmission data (Step S12). The process monitoring unit 13 monitors the process of the transmission processing, and hooks the transmission processing process when the processing process is activated (Step S13). Next, the data transmission control unit 15 determines whether the another transmission processing process is present (Step S14). Specifically, the data transmission control unit 15 refers to a record of the transmission process under execution in the storage 16, determines that the another process under transmission is present when any record is present, and determines that another process under transmission is not present when no record is present. When the data transmission control unit 15 determines that the another process under transmission is not present (Step S14; No), the data transmission control unit 15 executes the activated transmission process as it is, and transmits the data (Step S17).

When the data transmission control unit 15 determines that the another process under transmission is present (Step S14; Yes), the priority setting unit 14 sets a priority for the hooked transmission processing process (Step S15). For example, when the data transmission having a higher priority (transmission by the OLSR) is already executed, and the hooked transmission processing process is a transmission processing process of the data list in the DTN communication, the priority setting unit sets a lower priority (for example, "medium") for the hooked transmission processing process. Note that, as in the examples described with reference to FIG. 5 and FIG. 6, for the transmission processes by the DTN communication which are executed later, the priority setting unit 14 may set priority according to the individual situations. Moreover, for example, when the transmission processing process of the data list in the DTN communication is already executed, and the hooked transmission processing process is the processing process of the data transmission by the OLSR, then the priority setting unit 14 may set a higher priority (for example, "high") for the hooked transmission processing process, and may set a lower priority (for example, "medium") for the data list transmission processing process under execution. Moreover, for example, when the data transmission having a higher priority (transmission by the OLSR) is already executed, and the hooked transmission processing process is also a transmission processing process by the OLSR, the priority setting unit 14 sets also a higher priority (for example, "high") for the hooked transmission processing process.

When the priority setting unit 14 sets a priority, the data transmission control unit 15 controls the transmission processing process according to the set priority (Step S16). For example, when a transmission process having a higher priority is already activated, and a priority of a late-coming transmission process is lower, the data transmission control unit 15 suspends the late-coming transmission process, and resumes the data transmission process having a lower priority after completing the transmission process having a higher priority. Moreover, for example, when the transmission process having a lower priority is already activated, and a priority of the late-coming transmission process is higher, the data transmission control unit 15 suspends the transmission process activated earlier, and resumes the transmission process after completing the late-coming transmission process having a higher priority.

Note that, with regard to the transmission process continued to be executed, the data transmission control unit 15 records, in the storage 16, a process ID thereof as the under-execution transmission process, and with regard to the process of which transmission processing is suspended, the data transmission control unit 15 records, in the storage 16, a process ID thereof as the under-stop transmission processing process. Moreover, in a case of resuming the suspended transmission process, the data transmission control unit 15 records, in the storage 16, the process ID of the resumed transmission process as the under-execution transmission processing process, and with regard to a transmission process of which transmission is completed, deletes a record of a process ID thereof from the storage 16.

According to the present example embodiment, the priority of the data transmission is determined according to a property (necessity of being propagated in real-time, necessity of being made sure to arrive) of the data, and the data transmission is performed according to the priority. In such a way, for example, even when the data required to be urgently propagated and the data which are not required to be urgently propagated overlap each other in terms of the transmission timing, the data required to be urgently propagated can be transmitted preferentially. Particularly, when the information processing device (GW device 10) transmits the sensor data and the like by the OLSR and the DTN communication, a network occupation time by the transmission and reception of the data list in the DTN communication is long, which sometimes results in inhibition of the data transmission by the OLSR. According to the present example embodiment, delay of the data transmission using the OLSR due to the DTN communication can be reduced.

Moreover, even when the communication is the communication by the DTN, for example, when new data is registered thereby, there is a situation where it is desired to set a priority of the new data high. According to the present example embodiment, as illustrated in FIG. 5, the priority of the data transmission can be set, for example, according to the difference between the data stored by the another device and the data stored by the information processing device and the difference between the data stored by the information processing device and the data of which transmission to the another device is completed among the data stored by the information processing device. Accordingly, the situation as described above can be dealt with.

Second Example Embodiment

A description will be given below on a gateway device (information processing device) according to a second example embodiment of the present invention with reference to FIGS. 8 to 10.

Figure 8:
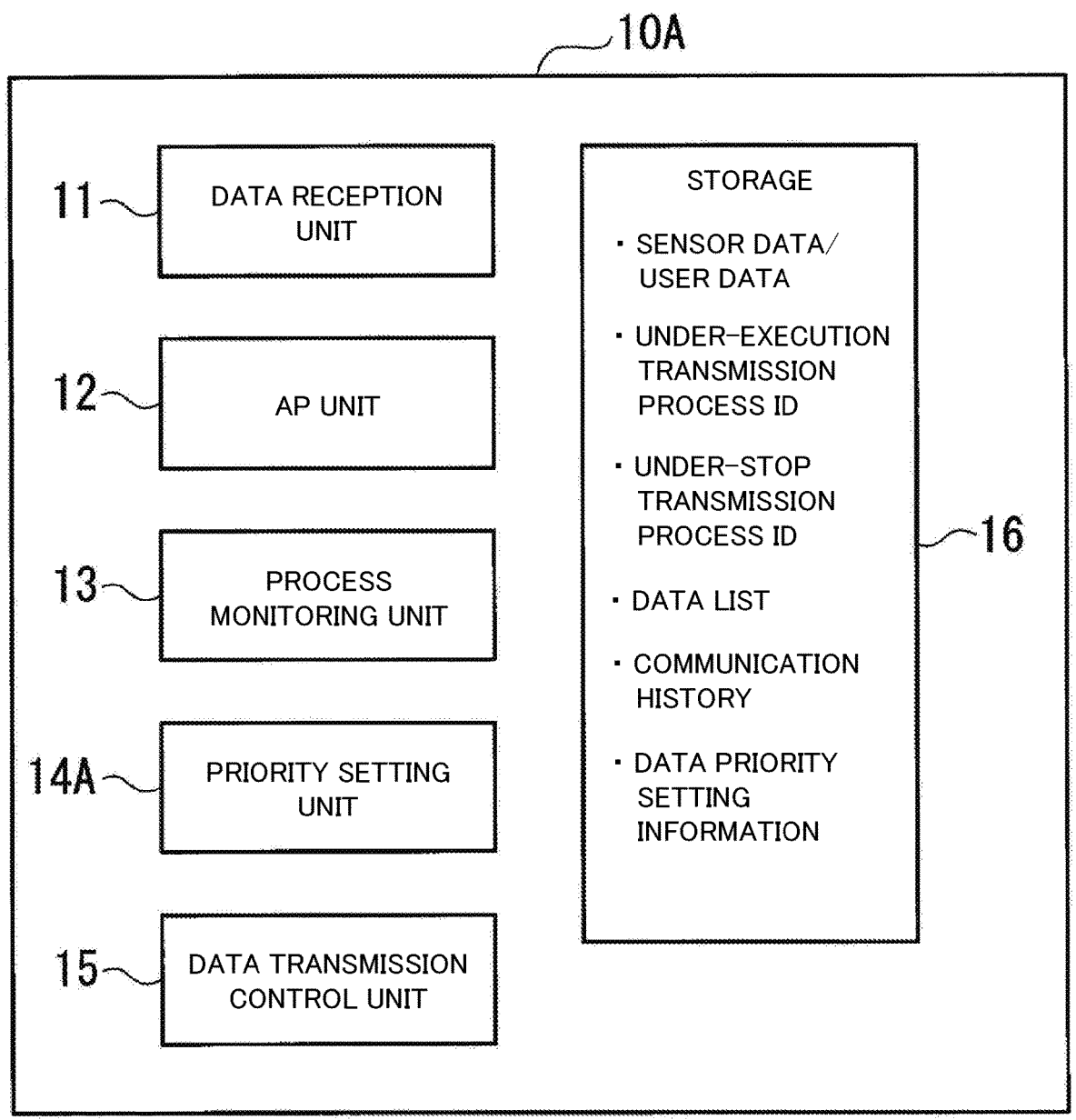
FIG. 8 is a functional block diagram illustrating an example of the gateway device according to the first example embodiment of the present invention.

FIG. 8 is a functional block diagram illustrating one example of the gateway device according to the first example embodiment of the present invention.

In the second example embodiment, a GW device 10 transmits all the sensor data and the like by the DTN communication without using the OLSR. The same reference numerals are assigned to the same components as those of the first example embodiment, and a detailed description thereof is omitted. As illustrated, a GW device 10A includes a data reception unit 11, an AP unit 12, a process monitoring unit 13, a priority setting unit 14A, a data transmission control unit 15, and a storage 16.

At a time of performing data transmission by the same DTN communication, the priority setting unit 14A sets a priority according to a type, context and size of sensor data.

Moreover, the storage 16 stores data priority setting information in addition to the contents described in the first example embodiment. In the data priority setting information, for example, information indicating that a priority of sensor data g is high and priority of sensor data h, i, and j are low is set. Moreover, a matter that the priority of the sensor data h is increased depending on a time zone, a matter that the priority of the sensor data i is increased depending on a place, and a matter that the priority of the sensor data j is increased when a value thereof becomes a predetermined threshold value or more are set in the data priority setting information. For example, the sensor data g are sensor data requiring continuous monitoring, such as a radiation dose and a detection amount of a certain substance. Moreover, the sensor data h are, for example, temperature data from 11 o'clock to 15 o'clock, while the sunshine is strong. Further, the sensor data i are, for example, noise data at an installed place of a machine tool emitting particularly loud noise in a factory or the like. Furthermore, the sensor data J are, for example, humidity data in a factory or the like, and the priority thereof is set to be increased when humidity becomes a predetermined threshold value or more. The predetermined threshold value in this case is, for example, a value determined according to a humidity criterion as to whether quality of a product is affected.

Figure 9:
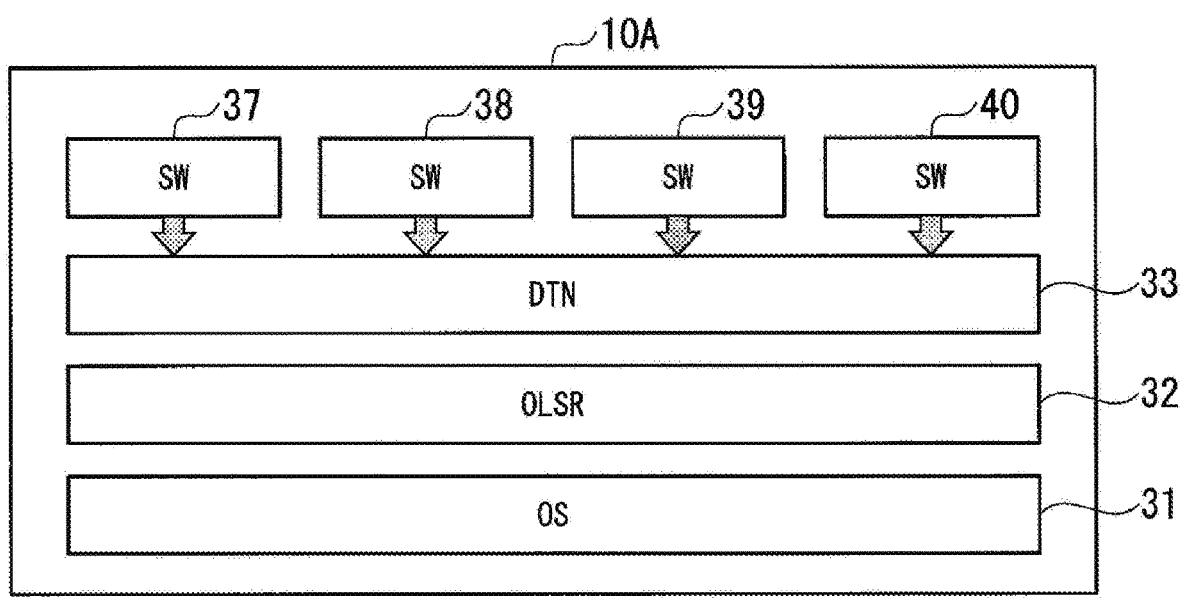
FIG. 9 is a diagram illustrating a configuration example of a transmission function of a gateway device according to a second example embodiment of the present invention.

FIG. 9 is a diagram illustrating a configuration example regarding a transmission function of the gateway device according to the second example embodiment of the present invention.

FIG. 9 illustrates that a OLSR 32 and a DTN 33 operate on a OS 31 which the GW device 10 includes. Moreover, unlike the first example embodiment, each of SW 37 to SW 40 performs data transmission by the DTN 33.

Herein, the SW 37 is software (AP unit 12) for acquiring sensor data having a higher priority and outputting the sensor data to the data transmission control unit 15. Moreover, the SW 38 is software (AP unit 12) for acquiring sensor data in which a priority changes depending on a time, and outputting the sensor data to the data transmission control unit 15. Further, the SW 39 is software (AP unit 12) for acquiring sensor data in which a priority changes depending on a place, and outputting the sensor data to the data transmission control unit 15. Furthermore, the SW 40 is software (AP unit 12) for acquiring sensor data in which a priority is increased by exceeding a threshold value, and outputting the sensor data to the data transmission control unit 15.

Figure 10:
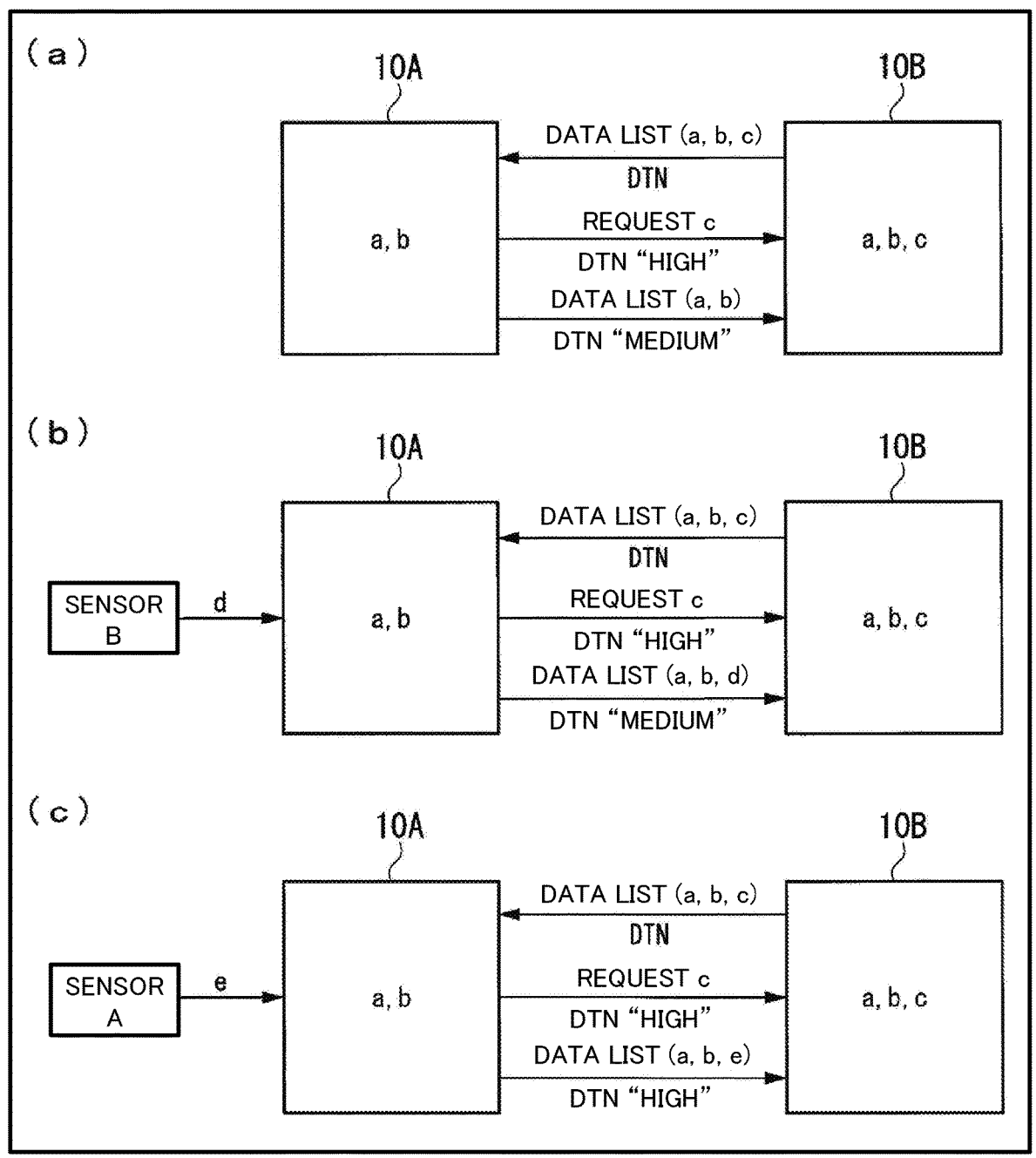
FIG. 10 is diagrams explaining a setting method of a priority of transmission processing according to the second example embodiment of the present invention.

FIG. 10 is diagrams explaining a setting method of a priority of transmission processing according to the second example embodiment of the present invention.

In FIG. 10, parts (a) and (c) illustrate examples of the setting method of the priority of the data transmission processing in the DTN communication.

In the part (a) of FIG. 10, it is assumed that processing of transmitting a telegraphic message for making a request for unheld sensor data c based on a data list received from the GW device 10B is under execution. Moreover, it is assumed that, during the transmission of the requesting telegraphic message, the GW device 10A is reached timing of data list transmission executed periodically. Then, the data transmission control unit 15 activates a process of the transmission processing of the data list, and the process monitoring unit 13 detects the process of the data list transmission processing. The priority setting unit 14 sets a priority "high" for a process of the transmission processing of the telegraphic message for making a request for the sensor data c unheld by the information processing device, and sets a priority "medium" for the process of the data list transmission processing. Based on the set priority, the data transmission control unit 15 transmits the data list after the transmission of the requesting telegraphic message is completed. The part (a) of FIG. 10 illustrates an example of comparing the high-priority processing (request for lacking data) and the transmission processing of the data list in the DTN communication with each other, and setting a priority of the data list transmission processing to a lower level. This example corresponds to FIG. 4 of the first example embodiment. Next, a case of further considering a priority of a data based on this example will be described.

In the part (b) of FIG. 10, also, it is assumed that the transmission process of the telegraphic message for making a request for the unheld sensor data c and the transmission process of the data list are under activation. However, in the example in the part (b) of FIG. 10, new data d registered by the information processing device is listed in a data list to be transmitted at a current time. Moreover, the data d are, for example, data acquired and transmitted by the SW 38 in FIG. 9, and it is assumed that a present time is in a time zone in which a priority of the data d is low. In this case, the priority setting unit 14 sets a priority "medium" for the transmission process of the data list which includes the data d, for example, based on a matter that the priority of the data d is low, though the data d are data registered by the information processing device. Based on the set priority, the data transmission control unit 15 transmits the data list after the transmission of the requesting telegraphic message is completed.

In the part (c) of FIG. 10, also, it is assumed that the transmission process of the telegraphic message for making a request for the unheld sensor data c and the transmission process of the data list are under activation. Moreover, in the example in the part (c) of FIG. 10 also, new data e registered by the information processing device is listed in a data list to be transmitted at the current time. Moreover, the data e are, for example, data acquired and transmitted by the SW 37 in FIG. 9, and are data having a higher priority. In this case, the priority setting unit 14 sets a priority "high" for the transmission process of the data list which includes the data e, for example, on the basis of a matter that the priority of the data e is high and a matter that the data e are registered by the information processing device. Based on the set priority, the data transmission control unit 15 performs the transmission of the requesting telegraphic message and the transmission of the data list concurrently with each other.

Moreover, in the example in the part (b) of FIG. 10, with regard to the data d acquired by the SW 38, when a time zone in which the data d are acquired is a time zone in which the priority of the data d is raised, then the priority setting unit 14 sets a priority "high" for the transmission process of the data list including the information on the data d.

As described above, according to the present example embodiment, even when data are transmitted and received by only the DTN communication, and the transmission of the data list and transmission timing of another data overlap each other, the transmission of the data list is suspended or discontinued, whereby the transmission of the another data to be given priority in the DTN communication can be executed without delay. Moreover, according to the priority of the data, the priority setting unit 14 sets the priority for each piece of the transmission processing. In such a way, even in a case of the transmission of the data list for example, it is possible to preferentially transmit the data list when the data list includes data having a higher priority.

Note that the above-described priority of the data may be configured to be arbitrarily settable by a user. For example, the time zone, the threshold value and the like may be made settable for each piece of software (SW 37 or the like) associated with the sensor data. Moreover, with regard to the place, the priority of the sensor data to be taken as an object may be made settable for each GW device 10 according to a place where the GW device 10 is installed.

Note that a change of the priority of the transmission processing according to the priority of the data is effective also in the first example embodiment. For example, when a value of certain sensor data is less than a threshold value, the sensor data are transmitted by the DTN communication, and when the value exceeds the threshold value, the sensor data are transmitted by the OLSR. By performing such switching control, it is possible to change the priority of the data transmission according to the threshold value also in the first example embodiment. Moreover, processing of changing a priority of data (and a priority of transmission processing of the data) depending on the time can be achieved by performing the data transmission processing by the OLSR in the time zone of raising the priority and by performing the data transmission by the DTN in a time zone other than the time zone of raising the priority.

The above-mentioned GW device 10 (information processing device) includes a computer therein. Processes of the respective pieces of processing by the above-mentioned GW device 10 (information processing device) are stored in a format of a program in a computer-readable recording medium, and the program is read out and executed by the computer, whereby the above-described processing is performed. Herein, the computer-readable recording medium refers to a magnetic disk, a magneto-optical disk, a CD-ROM, a DVD-ROM, a semiconductor memory or the like. Moreover, the computer program may be transmitted to the computer by a communication line, and the computer that has received the transmission may execute the program. Moreover, the above-described program may be a program for achieving a part of the above-mentioned functions. Further, the program may be a program capable of achieving the above-mentioned functions by being combined with a program already recorded in a computer system, that is, a so-called difference file (difference program). Further, all or some of each functions of the above-mentioned GW device 10 (information processing device) may be achieved by using hardware such as an application specific integrated circuit (ASIC), a programmable logic device (PLD), a field-programmable gate array (FPGA), and a programmable logic controller (PLC).

In addition, it is appropriately possible to substitute a well-known constituent for a constituent in the above-described example embodiments without departing from the spirit of the present invention. Moreover, the technical scope of the present invention is not limited to the above-described example embodiments, and it is possible to add a variety of changes thereto without departing from the spirit of the present invention. Note that the OLSR is an example of a first data communication means, and the DTN is an example of a second data communication means.

Some or all of the above-described example embodiments may also be described as in the following supplementary notes; however, are not limited to the following.

(Supplementary Note 1)

An information processing device includes:

a priority setting unit that, in transmitting and receiving periodic data with another device, when timing of transmitting the periodic data and timing of transmitting data having a higher priority than the periodic data overlap each other, sets a lower priority for transmission of the periodic data than transmission of the data.

(Supplementary Note 2)

In the information processing device according to supplementary note 1, the priority setting unit sets a priority of transmission of data in accordance with a difference between data stored by the another device and data stored by the information processing device or a difference between the data stored by the information processing device and data of which transmission to the another device is completed among the data stored by the information processing device.

(Supplementary Note 3)

In the information processing device according to supplementary note 2, when untransmitted data of which transmission to the another device is not completed is present in data stored by the information processing device, the priority setting unit sets a higher priority for transmission of the untransmitted data.

(Supplementary Note 4)

In the information processing device according to supplementary note 3, when the untransmitted data of which the transmission to the another device is not completed is not present in the data stored by the information processing device, the priority setting unit sets a lower priority for the transmission of the periodic data to the another device.

(Supplementary Note 5)

In the information processing device according to any one of supplementary notes 2 to 4, when unreceived data which is not stored by the information processing device is present in the data stored by the another device, the priority setting unit sets a higher priority for transmission of a telegraphic message on requesting the unreceived data.

(Supplementary Note 6)

In the information processing device according to any one of supplementary notes 1 to 4, when receiving the periodic data from the another device which does not communicate with the information processing device for a predetermined period or more, or when receiving the periodic data from the another device which does not communicate in past, the priority setting unit sets a higher priority for the transmission of the periodic data to the another device.

(Supplementary Note 7)

The information processing device according to any one of supplementary notes 1 to 6 includes further transmission control unit that, when timing of transmitting first data and timing of transmitting second data of which a priority is set lower than a priority for transmission of the first data overlap each other, stops transmitting the second data in accordance with the priority set by the priority setting unit.

(Supplementary Note 8)

In the information processing device according to supplementary note 7, the information processing device includes:

a first data communication unit; and a second data communication unit that, periodically transmitting and receiving a data list of the data stored by the information processing device with the another device, transmits a telegraphic message on requesting to transmit data which is not stored by the information processing device when the data is included in a data list received from the another device, and transmits data included in the data list stored by the information processing device to the another device when receiving a request to transmit the data from the another device, and the transmission control unit stops transmitting the data list when timing of transmitting the data list by the second data communication unit and timing of transmitting data by the first data communication unit overlap each other.

(Supplementary Note 9)

In the information processing device according to supplementary note 7, the information processing device includes data communication unit that periodically transmits and receives a data list of the data stored by the information processing device with the another device, transmits a telegraphic message on requesting to transmit data which are not stored by the information processing device when the data are included in a data list received from the another device, and transmits data included in the data list stored by the information processing device to the another device when receiving a request to transmit the data from the another device, the transmission control unit stops transmitting the data list when timing of transmitting the data list by the data communication means and timing of transmitting data having the higher priority set by the data communication means overlap each other.

(Supplementary Note 10)

An information processing method includes, in transmitting and receiving periodic data with another device, when timing of transmitting the periodic data and timing of transmitting data having a higher priority than the periodic data overlap each other, setting a lower priority for transmission of the periodic data than transmission of the data.

(Supplementary Note 11)

A computer-readable recording medium stores a program. The program causes a computer to execute processing of, in transmitting and receiving periodic data with another device, when timing of transmitting the periodic data and timing of transmitting data having a higher priority than the periodic data overlap each other, setting a lower priority for transmission of the periodic data than transmission of the data.

REFERENCE SIGNS LIST

10 Gateway device
11 Data reception unit
12 AP unit
13 Process monitoring unit
14, 14A Priority setting unit
15 Data transmission control unit
16 Storage

The invention claimed is:

1. An information processing device comprising:
a processor configured to:
in periodically transmitting and receiving periodic data with another device, the periodic data being one of a plurality of types of data, the plurality of types of data having different requirement to be propagated in real time,
when timing of transmitting the periodic data and timing of transmitting other data overlap each other, the other data being one of the plurality of types of data different from the periodic data, set a priority for transmission of the periodic data based on difference of the requirement to be propagated in real time between the periodic data and the other data,
wherein the processor is further configured to,
when timing of transmitting first data and timing of transmitting second data overlap each other, the first data being one of the plurality of types of data, the second data being data of which a priority is set lower than a priority for transmission of the first data,
stop transmitting the second data in accordance with the priority set by the processor, and wherein
the processor is further configured to:
periodically transmit and receive a data list of the data stored by the information processing device with the other device,
transmit a telegraphic message on requesting to transmit data which is not stored by the information processing device when the data is included in the data list received from the other device, and
transmit data included in the data list stored by the information processing device to the other device when receiving a request to transmit the data from the other device, and
wherein the processor stops transmitting the data list when timing of transmitting the data list and timing of transmitting data overlap each other.

2. An information processing device comprising:
a processor configured to:
in periodically transmitting and receiving periodic data with another device, the periodic data being one of a plurality of types of data, the plurality of types of data having different requirement to be propagated in real time,
when timing of transmitting the periodic data and timing of transmitting other data overlap each other, the other data being one of the plurality of types of data different from the periodic data, set a priority for transmission of the periodic data based on difference of the requirement to be propagated in real time between the periodic data and the other data,
wherein the processor is further configured to,
when timing of transmitting first data and timing of transmitting second data overlap each other, the first data being one of the plurality of types of data, the second data being data of which a priority is set lower than a priority for transmission of the first data,
stop transmitting the second data in accordance with the priority set by the processor, and wherein
the processor is further configured to:
periodically transmit and receive a data list of the data stored by the information processing device with the other device,
transmit a telegraphic message on requesting to transmit data which are not stored by the information processing device when the data are included in the data list received from the other device, and
transmit data included in the data list stored by the information processing device to the other device when receiving a request to transmit the data from the another device,
wherein the processor stops transmitting the data list when timing of transmitting the data list and timing of transmitting data having the higher priority overlap each other.

* * * * *